United States Patent
Pruitt et al.

(10) Patent No.: US 11,644,197 B2
(45) Date of Patent: May 9, 2023

(54) SYSTEM AND METHOD FOR BIMODAL AIR CONTROL IN A KETTLE-STYLE GRILL

(71) Applicant: Spider Grills, LLC, Athens, GA (US)

(72) Inventors: Joseph Pruitt, Athens, GA (US); Jeffrey Broadrick, Athens, GA (US)

(*) Notice: Subject to any disclaimer, the term of this patent is extended or adjusted under 35 U.S.C. 154(b) by 211 days.

(21) Appl. No.: 17/353,467

(22) Filed: Jun. 21, 2021

(65) Prior Publication Data
US 2022/0163208 A1 May 26, 2022

Related U.S. Application Data

(63) Continuation of application No. 16/953,695, filed on Nov. 20, 2020, now Pat. No. 11,125,438.

(51) Int. Cl.
*F24B 5/02* (2006.01)
*F24B 13/00* (2006.01)
(Continued)

(52) U.S. Cl.
CPC ........... *F24B 5/023* (2013.01); *A47J 36/321* (2018.08); *A47J 37/0704* (2013.01); *A47J 37/0754* (2013.01); *F23N 3/005* (2013.01); *F23N 3/085* (2013.01); *F23N 3/087* (2013.01); *F24B 1/19* (2013.01); *F24B 13/008* (2013.01);
(Continued)

(58) Field of Classification Search
CPC .. A47J 37/0754; A47J 37/0704; A47J 36/321; F23N 3/005; F23N 3/085; F23N 3/087; F23N 2233/06; F23N 2233/08; F23N 2225/08; F24B 1/19; F24B 5/023; F24B 13/008; F24F 11/30; F24F 2011/0002

USPC ................ 126/15 A, 21 A, 29, 15 R, 275 R; 99/330, 474; 454/258
IPC ....... A47J 37/07; F23N 3/08; F24B 1/19,5/02, 13/00
See application file for complete search history.

(56) References Cited

U.S. PATENT DOCUMENTS 3,327,697 A * 6/1967 Berlant ..................... F24F 9/00
126/25 R
4,520,791 A 6/1985 Chamberlain
(Continued)

FOREIGN PATENT DOCUMENTS

CN 104159483 A 11/2014
CN 105823088 A 8/2016
(Continued)

*Primary Examiner* — Steven B McAllister
*Assistant Examiner* — Daniel E. Namay
(74) *Attorney, Agent, or Firm* — Smith Tempel Blaha LLC; Matthew T. Hoots

(57) ABSTRACT

Exemplary embodiments of a system and method for bimodal air control in a kettle-style grill are configured to be detachably mounted to the exterior of a kettle-styled grill such as, but not limited to, a Weber® charcoal grill. When mounted to the kettle-styled grill, a plenum-like component directs air flows to the interior of the grill's kettle via the kettle's lower body damper holes. A manually adjustable intake damper in the plenum component allows, restricts, or prevents a drawn ambient air flow into the plenum component. Separately, a forced air flow generated by a fan may also be provided into the plenum component. Adjustment of the intake damper may also adjust damper blades inside the grill's kettle. Ash that falls out of the kettle's damper holes falls through the plenum component and is captured in an ash receptacle that is removably mounted to the plenum component.

18 Claims, 5 Drawing Sheets

(51) Int. Cl.
*F23N 3/00* (2006.01)
*A47J 37/07* (2006.01)
*A47J 36/32* (2006.01)
*F24B 1/19* (2006.01)
*F23N 3/08* (2006.01)

(52) U.S. Cl.
CPC ...... *F23N 2225/08* (2020.01); *F23N 2233/06* (2020.01); *F23N 2233/08* (2020.01)

(56) References Cited

U.S. PATENT DOCUMENTS

| | | | |
|---|---|---|---|
| 4,747,781 A | 5/1988 | Patenaude | |
| 4,788,905 A * | 12/1988 | Von Kohorn | A47J 37/0781 454/189 |
| 5,036,832 A * | 8/1991 | Schlosser | A47J 37/0704 D7/334 |
| 5,154,159 A | 10/1992 | Knafelc | |
| 5,168,860 A | 12/1992 | Kibourian | |
| 6,223,737 B1 | 5/2001 | Buckner | |
| 8,479,720 B1 | 7/2013 | Figueroa | |
| 8,800,542 B1 | 8/2014 | Kennington | |
| 10,595,540 B1 | 3/2020 | Knight | |
| 10,638,881 B1 | 5/2020 | Holt | |
| 11,125,438 B1 * | 9/2021 | Pruitt | F24B 1/19 |
| 2007/0272229 A1 * | 11/2007 | Becker | A47J 37/079 126/25 B |
| 2008/0138194 A1 | 6/2008 | Wei | |
| 2008/0233861 A1 | 9/2008 | Jenkins | |
| 2009/0056695 A1 | 3/2009 | Cosgrove | |
| 2009/0215380 A1 | 8/2009 | Lin | |
| 2011/0168158 A1 | 7/2011 | Barkhouse | |
| 2012/0090593 A1 * | 4/2012 | Urquhart | A47J 37/079 126/25 B |
| 2013/0061765 A1 | 3/2013 | Reinhart | |
| 2014/0090634 A1 | 4/2014 | Li | |
| 2015/0289718 A1 * | 10/2015 | Gross | A47J 37/079 126/25 B |
| 2016/0338536 A1 * | 11/2016 | Witsch | A47J 37/0786 |
| 2016/0374509 A1 | 12/2016 | Blomberg | |
| 2017/0150847 A1 | 6/2017 | Feng | |
| 2017/0202395 A1 | 7/2017 | Lomonaco | |
| 2018/0008093 A1 | 1/2018 | Parker | |
| 2018/0376614 A1 | 12/2018 | Xiong | |
| 2019/0234647 A1 | 8/2019 | Chen | |
| 2019/0245296 A1 | 8/2019 | Murad | |
| 2019/0309955 A1 | 10/2019 | Castillo | |
| 2020/0017872 A1 | 1/2020 | Brennan | |
| 2020/0093145 A1 | 3/2020 | Powell | |
| 2020/0178727 A1 | 6/2020 | Brennan | |
| 2020/0178728 A1 | 6/2020 | Brennan | |
| 2020/0214503 A1 | 7/2020 | Altenritter | |
| 2022/0163209 A1 * | 5/2022 | Pruitt | A47J 37/0704 |

FOREIGN PATENT DOCUMENTS

| | | |
|---|---|---|
| CN | 105889983 A | 8/2016 |
| CN | 106471314 A | 3/2017 |
| CN | 111434292 A | 7/2020 |
| FR | 2860965 | 4/2005 |

\* cited by examiner

SYSTEM AND METHOD FOR BIMODAL AIR CONTROL IN A KETTLE-STYLE GRILL

BACKGROUND

The present invention relates to outdoor grilling and smoking solutions and, more particularly, to a novel system for enabling bimodal air control in a kettle-styled grill designed for use with charcoal.

Kettle-styled grills designed for use with a charcoal briquette fuel source, such as a typical Weber® grill, are relatively inexpensive and ubiquitous in the marketplace. As one of ordinary skill in the art of kettle-styled grills would recognize, air flow is usually controlled manually through lower dampers located in the bottom of the grill's kettle and, optionally, also through upper dampers located in the lid of the kettle. In addition to affecting air flow, the lower dampers may also be configured in a typical kettle-styled grill to agitate ash out of the kettle so that the ash may be collected in an ash can component located beneath the kettle. With skill and knowledge, the manual dampers (lower and/or upper) of a typical kettle-styled grill may be periodically adjusted and set by a user to control cooking temperature and/or smoke retention within the grill.

The skill and knowledge required by a kettle grill user to effectively manipulate and control air flow with manual dampers has led the industry to introduce various forced-air "add on" solutions designed to alleviate a user's need for mastery of the manual dampers. The prior art solutions, however, typically require that the kettle be modified with a "cut-out" and/or prevent a user from opting for manual damper control.

Therefore, there is a need in the art for a system and method that does not require modification of the grill's kettle and, additionally, enables a user to selectively alternate between a manual mode and an auto-mode for air control through the kettle. More specifically, there is a need in the art for a bimodal air control system in a kettle-styled grill.

SUMMARY

Exemplary embodiments of a system and method for bimodal air control in a kettle-style grill are disclosed. Certain embodiments are configured to be detachably mounted to the exterior of a kettle-styled grill such as, but not limited to, a Weber® charcoal grill. When mounted to the kettle-styled grill, a plenum-like component directs air flows to the interior of the grill's kettle via the kettle's lower body damper holes. A manually adjustable intake damper in the plenum component allows, restricts, or prevents a drawn ambient air flow into the plenum component. Separately, a forced air flow generated by a fan may also be provided into the plenum component. Ash that falls out of the kettle's damper holes falls through the plenum component and is captured in an ash receptacle that is removably mounted to the plenum component. In this way, embodiments of the solution do not require significant, if any, modification to the kettle-styled grill in order for the kettle-styled grill to use the bimodal air control system. Embodiments may also include temperature loop control of the fan.

An exemplary embodiment of a system for bimodal air control in a kettle-style grill having one or more damper holes in a lower portion of its kettle comprises 1) one or more positionable damper blades associated with the one or more damper holes in the lower portion of the kettle, each damper blade operable to be positioned such that it opens, restricts or closes off its associated damper hole; 2) a damper plenum having an open top and an open bottom, the damper plenum comprising a manually adjustable intake damper and a forced-air input port, wherein the manually adjustable intake damper is mechanically connected to the one or more positionable damper blades; 3) an ash receptacle component removably attached to the damper plenum; and 4) an air control unit comprising a variable speed fan.

The air control unit may further comprise a temperature sensor in electrical communication with an electronic controller configured to vary the speed of the fan. The electronic controller may be operable to apply a proportional-integral-derivative control algorithm and may also be configured to wirelessly communicate with a remote user device.

The damper plenum is configured to be mounted to the kettle-style grill such that the open top establishes a seal around an external area of the kettle that includes the one or more damper holes. The air control unit is attached to the damper plenum such that a forced air flow generated by the fan enters the damper plenum through the forced-air input port. And a drawn ambient air flow enters the damper plenum through the manually adjustable intake damper when the manually adjustable intake damper is in an open state.

Further to the exemplary embodiment, when the manually adjustable intake damper is in an open state, the one or more positionable damper blades are positioned in the kettle such that the one or more damper holes are closed off. Similarly, when the manually adjustable intake damper is in a closed state, the one or more positionable damper blades are positioned in the kettle such that the one or more damper holes are fully open. And, when the manually adjustable intake damper is in a partially open state, the one or more positionable damper blades are positioned in the kettle such that the one or more damper holes are partially restricted. Ash exiting the grill's kettle through the one or more damper holes is captured in the ash receptacle which is below the plenum.

Another exemplary embodiment of a system for bimodal air control in a kettle-style grill having one or more damper holes in a lower portion of its kettle comprises: 1) means for opening, restricting or closing off each of the one or more damper holes; 2) means for adjusting a drawn ambient air flow between fully open, fully closed, and partially open states; 3) means for adjusting a forced air flow; and 4) means for capturing ash expelled from the kettle. The means for adjusting the drawn ambient air flow operates simultaneously to adjust the means for opening, restricting or closing off each of the one or more damper holes. The drawn ambient air flow and the forced air flow both enter the kettle through the one or more damper holes.

When the means for adjusting the drawn ambient air flow between fully open, fully closed, and partially open states is in an open state, the means for opening, restricting or closing off each of the one or more damper holes operates to close off the one or more damper holes. Similarly, when the means for adjusting the drawn ambient air flow between fully open, fully closed, and partially open states is in a closed state, the means for opening, restricting or closing off each of the one or more damper holes operates to open the one or more damper holes. And, when the means for adjusting the drawn ambient air flow between fully open, fully closed, and partially open states is in a partially open state, the means for opening, restricting or closing off each of the one or more damper holes operates to restrict the one or more damper holes.

The means for adjusting a forced air flow comprises a temperature sensor in electrical communication with an electronic controller configured to vary a speed of a fan. The electronic controller may be operable to apply a proportional-integral-derivative control algorithm and may be configured to wirelessly communicate with a remote user device.

DETAILED DESCRIPTION

Various embodiments, aspects and features of the present invention encompass a system and method for bimodal air control in a kettle-styled grill (e.g., a Weber® grill designed for use with a briquette charcoal fuel). As one of ordinary skill in the art would understand and recognize, kettle-styled grills are primarily designed for manual manipulation of damper(s) to control an air flow through the kettle.

When a typical kettle-styled grill is used as intended, charcoal is placed in the kettle of the grill and ignited. A cooking grate is suspended within the kettle over the top of the charcoal. Thermal energy generated by the burning charcoal radiates upward toward the grate and cooks any food item placed thereon. To control temperature, rate of burn and smoke retention, kettle-styled charcoal grills usually rely on a somewhat crude, manual damper-type control. Some kettle-styled grills incorporate the damper on the top of a lid that mates to and over the lower kettle. Other kettle-styled grills, however, such as what is commonly known as a Weber® branded grill, incorporate a damper at the bottom of the kettle (often in addition to a damper on the lid of the kettle), thereby providing means for control of air directly to, and through, the burning charcoal.

As one of ordinary skill in the art would acknowledge, temperature, burn rate and smoke retention are all key parameters to be controlled when using a kettle-styled grill. And so, a user's experience and skill in leveraging the manual dampers may have a direct impact on the quality of the food being cooked. To improve control of the air flow in a kettle-styled grill, incorporation of an electric fan and temperature control loop may be used in lieu of the manual dampers.

Advantageously, embodiments of the solution are configured to detachably integrate to a kettle-styled grill having lower dampers in the kettle, without requiring modification of the kettle, and provide a user with a bimodal option to use the grill in a manual damper mode or in an auto-damper mode. When in the manual damper mode, the solution allows the user to rely on manual setting and manipulation of the lower dampers, while in the auto-damper mode the user may rely on an electric fan to force air through the lower damper holes in response to a temperature control loop. As will be better understood from the attached figures and the following description, embodiments of the solution may be integrated onto an existing kettle-styled grill without modifying the kettle (such as cutting a hole in the kettle) or rendering the lower dampers inoperable for ash removal and manual damping.

Figure 1:
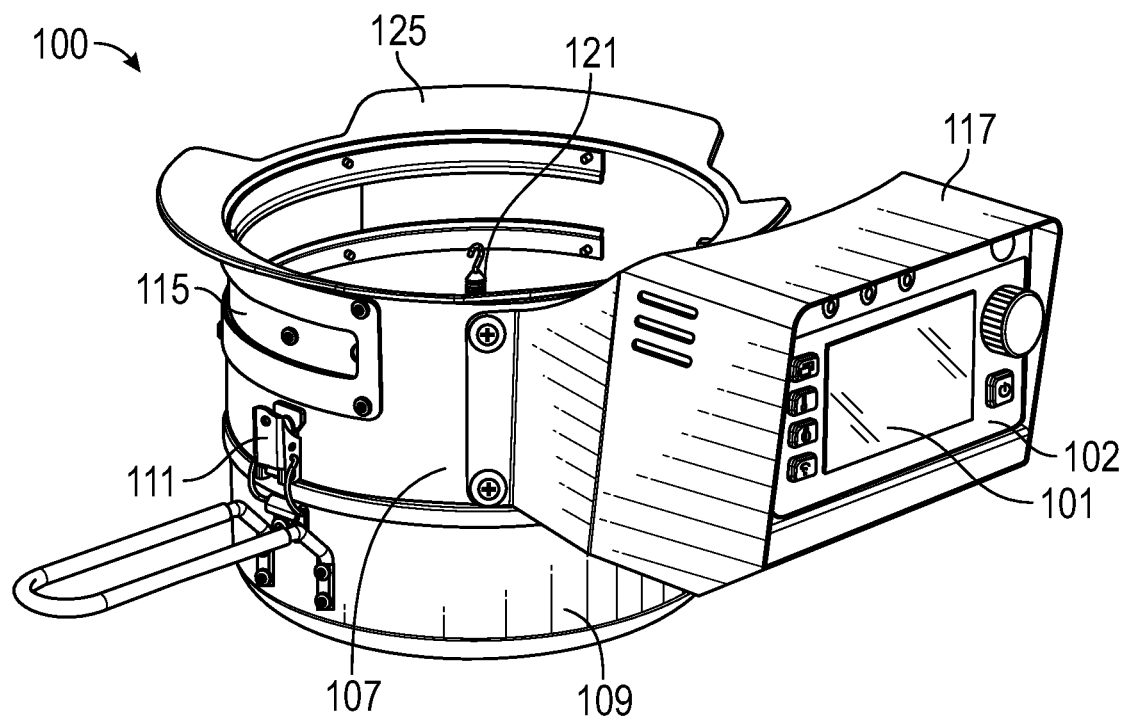
FIG. 1 illustrates an exemplary embodiment of a bimodal air control system for kettle-styled grills according to the solution.
Figure 2:
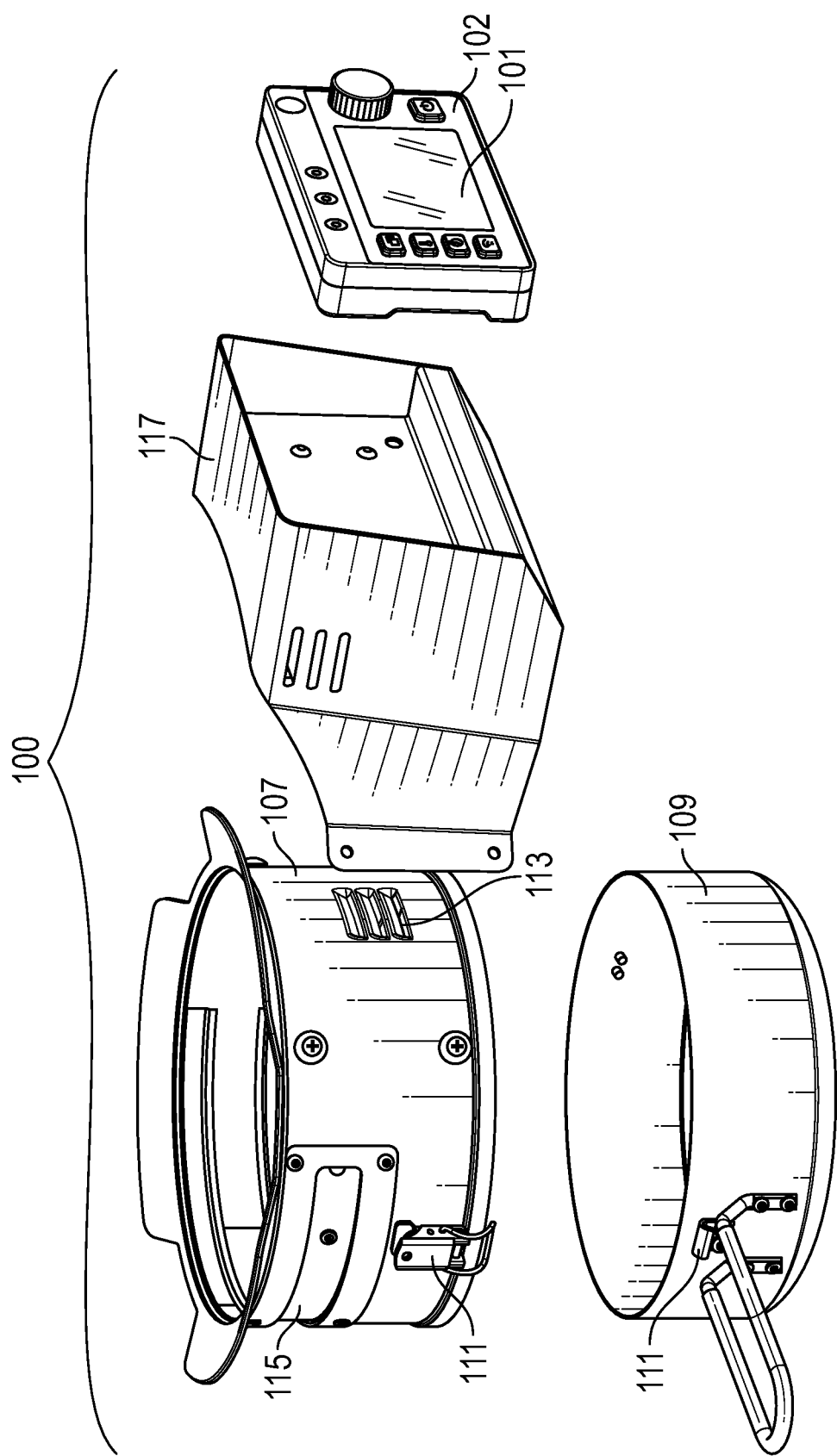
FIG. 2 is an exploded view of the exemplary embodiment shown in FIG. 1.
Figure 3:
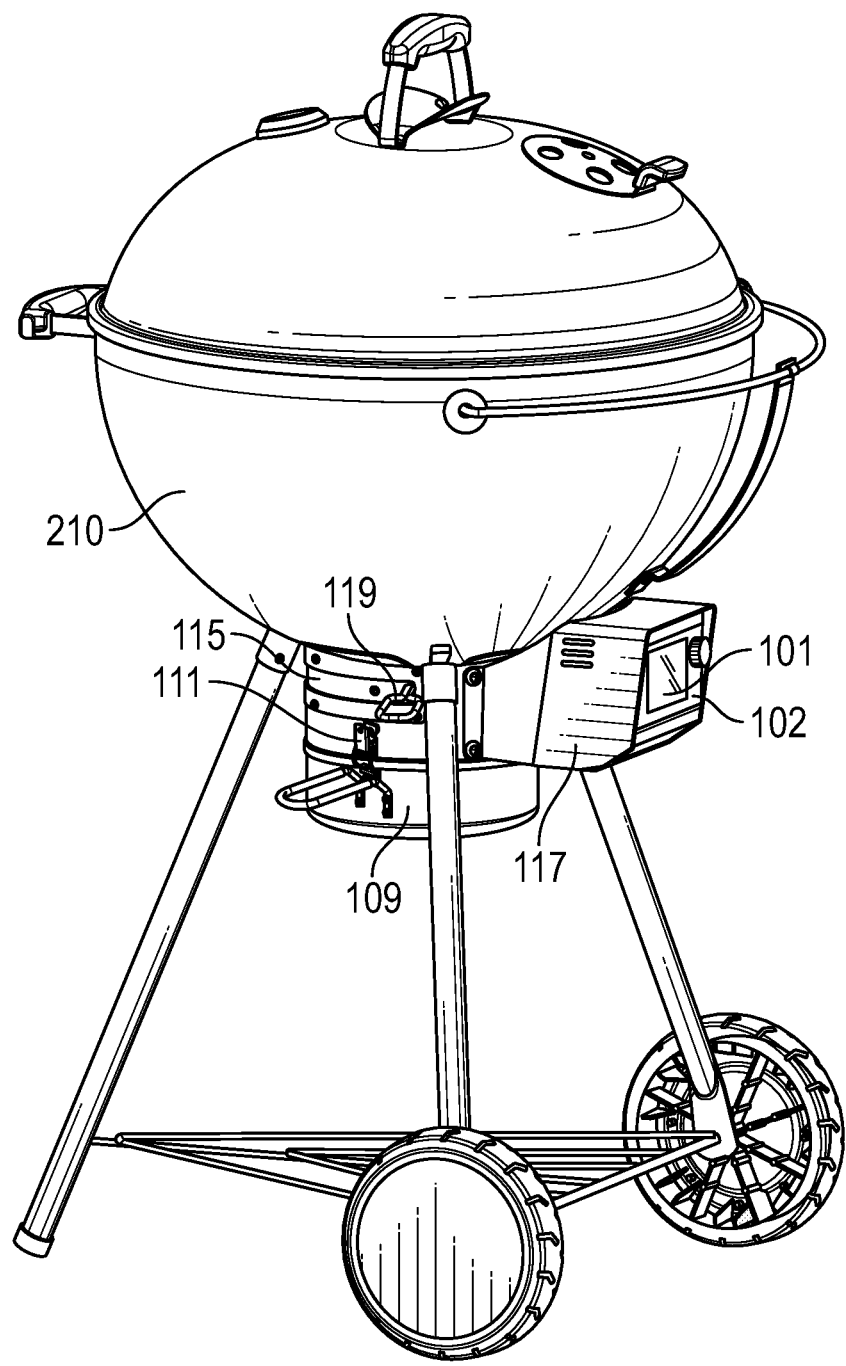
FIG. 3 illustrates the exemplary embodiment of FIG. 1, shown mounted to a kettle-styled grill.
Figure 4:
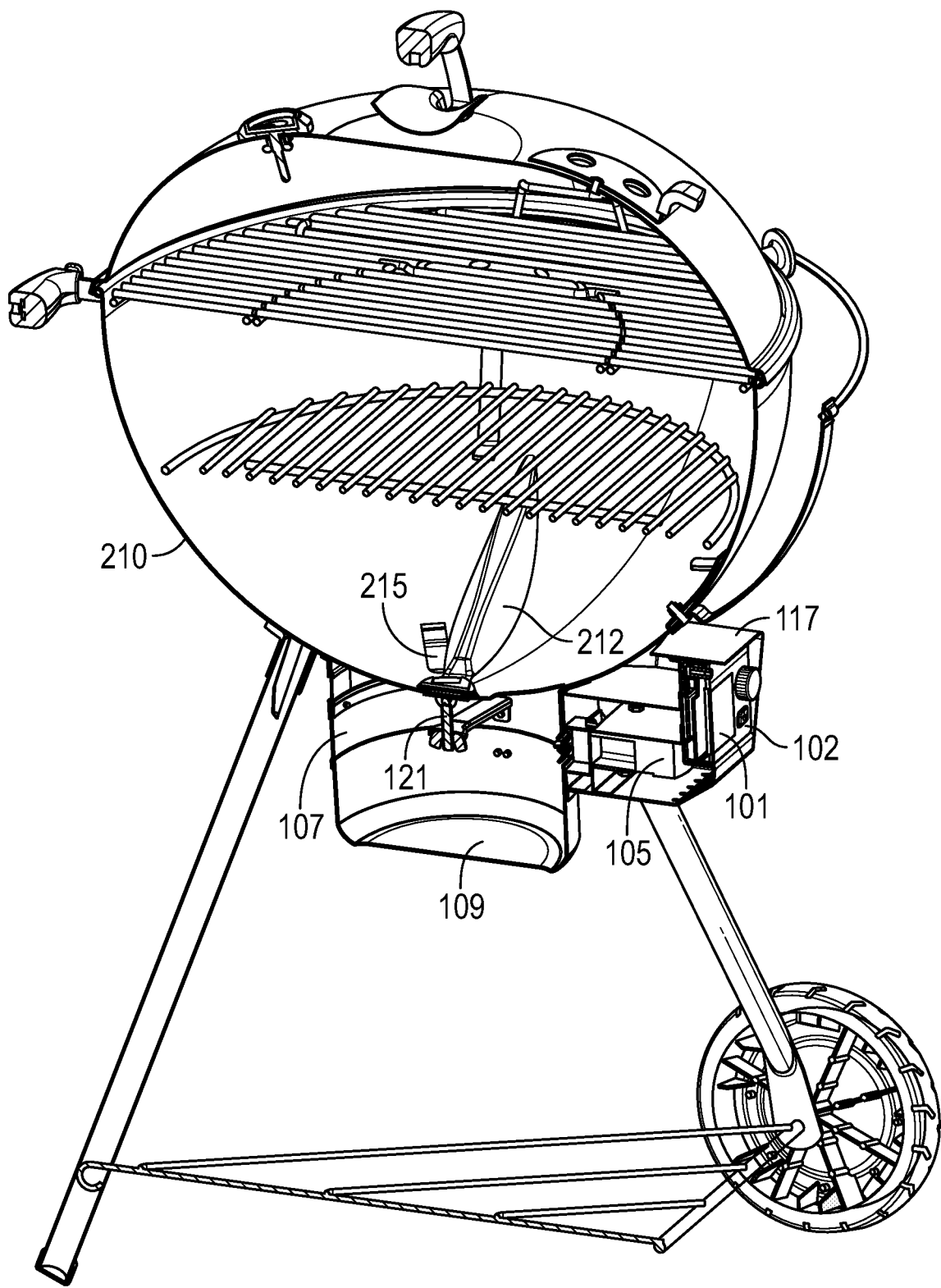
FIG. 4 is a sectioned view of the FIG. 3 illustration to illustrate the exemplary linkage between the novel system and the lower dampers of the kettle-styled grill.
Figure 5:
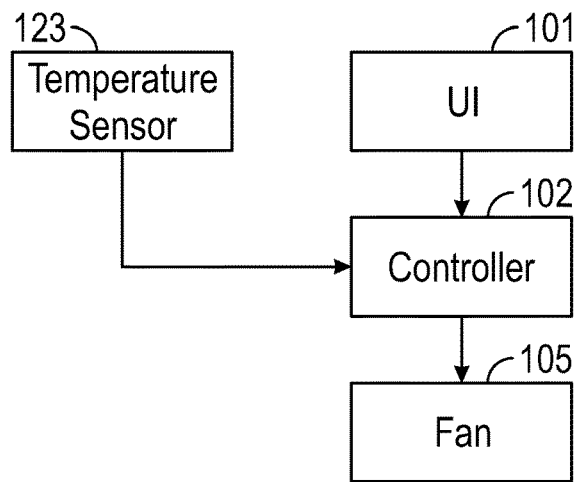
FIG. 5 is a functional block diagram of the electrical components comprised within an exemplary embodiment of the solution for a bimodal air control system for kettle-styled grills.

Turning now to the figures, an exemplary embodiment of a bimodal air control system 100 will be shown and described with collective reference to the illustrations in FIGS. 1-5. That is, each of the illustrations in FIGS. 1-5 will be described simultaneously. FIG. 1 generally illustrates an exemplary embodiment of a bimodal air control system 100 for kettle-styled grills according to the solution, while FIG. 2 illustrates an exploded view of same. FIGS. 3 and 4 illustrate the exemplary embodiment attached to a kettle-styled grill. FIG. 5 is a functional block diagram of the electrical components comprised within a control system of an exemplary embodiment of the solution for a bimodal air control system for kettle-styled grills.

As should be apparent from the figures, the system 100 may be configured for mounting to the exterior of a kettle-styled charcoal grill. The bimodal air control system 100 may be mated/juxtaposed to the kettle 210 (see, for example, FIGS. 3 and 4) of the grill such that the system 100 is positioned beneath and to the side of the kettle 210. The mating flanges 125 of the damper plenum 107 may form a tight seal with the underside of the kettle.

The damper plenum 107 comprises a manually adjustable intake damper 115 that, when partially open, provides for a restricted intake of a drawn ambient air flow into the inner space of the damper plenum 107 (when the system 100 is in the manual damper mode) and, when fully closed, prevents inflow of ambient air into the damper plenum 107 while simultaneously preventing outflow of a forced air flow injected into the plenum 107 via a fan 105 (when the system is in the auto damper mode). Air flow into the plenum 107, whether from a drawn ambient air flow or a forced air flow generated by fan 105 (or a combination of both), may exit the damper plenum 107 and enter the kettle 210 of the grill via open lower damper holes 215 (see FIG. 4).

To be clear, manipulation of the adjustable intake damper 115 position via handle 119 corresponds with manipulation of damper blade 212 positions within the kettle 210 in order to open, restrict, or close off lower damper holes 215 in the kettle. The intake damper 115 may be mechanically connected to the damper blades 212 via connection 121 in order for adjustment of the intake damper 115 to correspondingly cause adjustment of the damper blades 212. Generally, when intake damper 115 is fully closed, the lower damper holes 215 may be fully open (due to the position of damper blades 212) and the bimodal air control system 100 may be in auto-damper mode such that the only air flow into the damper plenum 107 (and subsequently into the kettle 210 via open lower damper holes 215) is a forced air flow attributable to electric fan 105. And, when the intake damper 115 is fully open, the lower damper holes 215 may be fully closed (due to the position of damper blades 212) and the bimodal air control system 100 may be in shutdown mode such that no air is allowed to flow into the kettle 210 from damper plenum 107. When the intake damper 115 is partially open, the lower damper holes 215 may also be partially open (due to the position of damper blades 212) to modulate air flow into the kettle 210 and the bimodal air control system 100 may be in manual damper mode. When the system 100 is in manual damper mode, a drawn ambient air flow may be pulled into the damper plenum 107 and, subsequently, into the kettle 210. Depending on embodiment of the solution, the fan 105 may provide a supplemental forced air flow into the damper plenum 107 when the system 100 is in a manual damper mode.

As one of ordinary skill in the art of kettle-styled grills would understand, manipulation of the damper blades 212 within the kettle may agitate ash and cause the ash to exit the kettle through lower damper holes 215. The ash may fall gravitationally through the damper plenum 107 and collect in ash can or ash receptacle 109. The ash can 109 may be releasably connected to the lower portion of the damper plenum 107 via a latch 111 or other means. In this way, a user of the system 100 may periodically empty collected ash by simply disconnecting the ash can 109 and without any need for disconnecting the damper plenum 107 and/or the entire system 100 from the grill.

Embodiments of the solution may leverage a controller 102 that includes a graphical user interface 101 or the like. The graphical user interface 101 may be local (such as depicted in the figure illustrations) and/or may be remotely displayed on a wirelessly connected user device. The controller 102, along with a fan 105, may be comprised within an air control unit defined by a housing 117 that is configured to mount on the outside of the damper plenum 107 and the kettle 210. The controller 102 may include a processor, memory component(s), wireless transceiver, power supply, etc., as would be understood by one of ordinary skill in the art of electronic controllers. The controller 102 may have stored within its memory any one or more temperature control algorithms that, when executed by the processor, cause a speed adjustment to the fan 105. That is, the controller 102 may be configured to receive temperature set points dictated by the user or, depending on embodiment, a temperature control algorithm may predefine a temperature set point without user input. The temperature setting informs the controller 102 in view of the temperature sensor 123 signal to vary the speed of the fan. The controller 102 may leverage a proportional-integral-derivative ("PID") control algorithm, as would be understood by one of ordinary skill in the art of process control. In this way, the controller 102 may adjust the fan speed, and by extension the flow rate of a forced air flow into damper plenum 107, in response to a temperature reading from temperature sensor 123.

It is further envisioned that embodiments of the controller 102 may be configured to wirelessly communicate with a software application or the like running on a remote user device such as, but not limited to, a smartphone or pad device. In such embodiments, the user interface 101 may be partially comprised of a user interface on the remote user device. The user may leverage the remote user interface 101, and/or the local user interface 101 (as shown in the figures), to adjust selection of the temperature control algorithm and/or monitor feedback data points (e.g., temperature, cooking time, alarms, etc.), as would be understood by one of ordinary skill in the art.

The one or more temperature control algorithms may rely on inputs from a temperature sensor 123 that may be placed on the cooking grate or elsewhere inside the kettle 210. Depending on the particular embodiment, it is envisioned that the solution may leverage temperature sensor feedback from multiple temperature sensors positioned in multiple locations within and/or outside kettle 210. The temperature sensor(s) 123 provides feedback to the controller 102 that, in turn, controls fan speed. By controlling the fan speed, the controller 102 may cause a cooking temperature to be maintained at a desired temperature setting since a forced air flow into the damper plenum through input port 113 will enter kettle 210 via lower damper holes 215 and affect cooking temperature.

Figure 6:
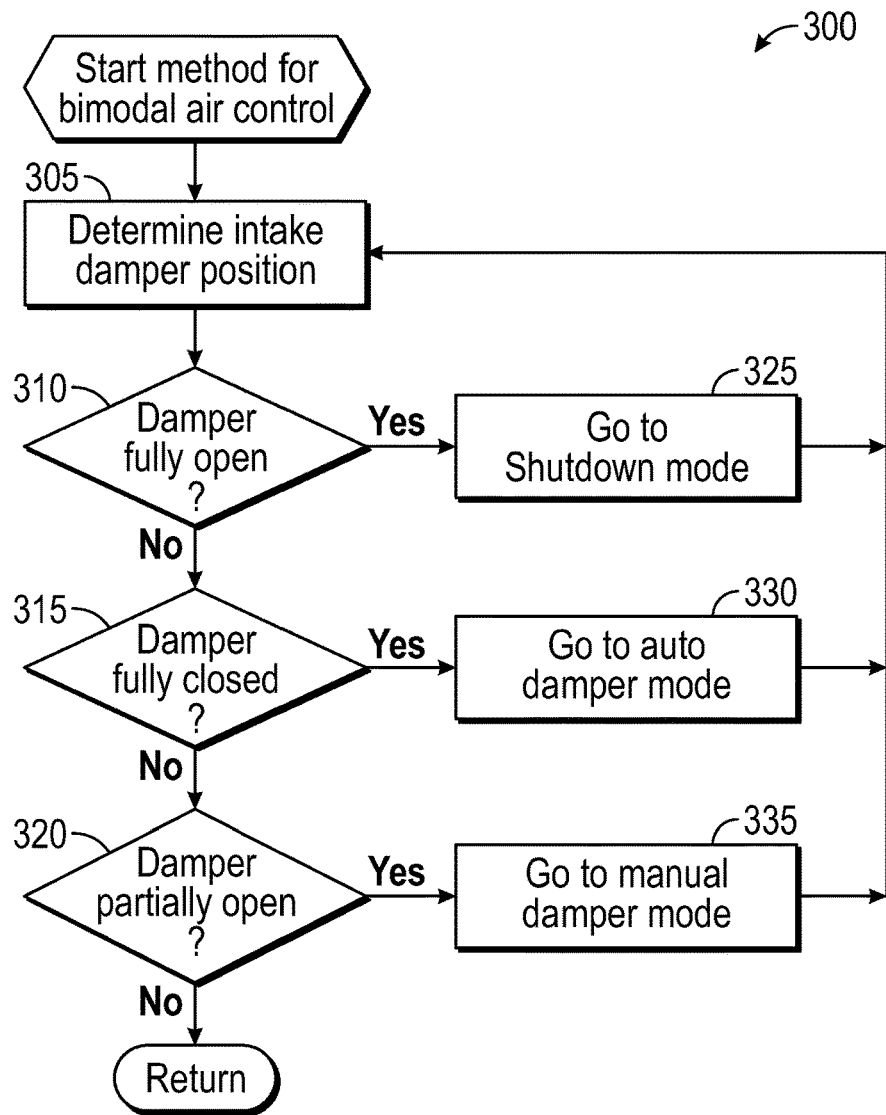
FIG. 6 is a flowchart illustrating an exemplary method for implementing bimodal air control in a kettle-styled grill using a bimodal air control system according to the solution.

FIG. 6 is a flowchart illustrating an exemplary method 300 for implementing bimodal air control in a kettle-styled grill using a bimodal air control system according to the solution. Beginning with block 305, the controller 102 may recognize or determine the position of the intake damper 115. In some embodiments, the controller 102 may rely on a user input to determine the intake damper 115 position while in other embodiments the controller 102 may be configured to receive a position sensor input to determine intake damper 115 position.

Returning to the method 300, at decision block 310 the "yes" branch may be followed if the intake damper 115 is fully open. With the intake damper 115 fully open, the lower damper holes 215 in the kettle 210 may be fully closed. And so, the method 300 may arrive at block 325 and set the system 100 to shutdown mode. In shutdown mode, the controller 102 may cease actuation of fan 105 or, alternatively, may continue to force air through input port 113 into damper plenum 107 in order to improve thermal energy dissipation from kettle 210. The method 300 returns to block 305 to monitor any changes in the position of intake damper 115. If at decision block 310 it is determined that the intake damper 115 is not fully open, however, then the method 300 follows the "no" branch to decision block 315.

At decision block 315 the "yes" branch may be followed if the intake damper 115 is fully closed. With the intake damper 115 fully closed, the lower damper holes 215 in the kettle 210 may be fully open. And so, the method 300 may arrive at block 330 and set the system 100 to auto-damper mode. In auto-damper mode, the controller 102 may modulate the speed of fan 105 based on an input from temperature sensor 123 and, in doing so, provide a forced air flow through input port 113 into damper plenum 107. A drawn ambient air flow into damper plenum 107 may be prevented by virtue of the closed intake damper 115. The forced air flow may enter kettle 210 through the fully open damper holes 215 in order to affect combustion and cooking temperature. The method 300 returns to block 305 to monitor any changes in the position of intake damper 115. If at decision block 315 it is determined that the intake damper 115 is not fully closed, however, then the method 300 follows the "no" branch to decision block 320.

At decision block 320 the "yes" branch may be followed if the intake damper 115 is partially open. With the intake damper 115 partially open, the lower damper holes 215 in the kettle 210 may also be partially open. And so, the method 300 may arrive at block 335 and set the system 100 to manual damper mode. In manual damper mode, the controller 102 may modulate the speed of fan 105 based on an input from temperature sensor 123 and, in doing so, provide a forced air flow through input port 113 into damper plenum 107 that supplements a drawn air flow into damper plenum 107 from partially open intake damper 115. Alternatively, the controller 102 may shut off fan 105 such that the only air flow into damper plenum 107 is a drawn air flow through the partially open intake damper 115. The air flow may enter kettle 210 through the partially open damper holes 215 in order to affect combustion and cooking temperature. The method 300 returns to block 305 to monitor any changes in the position of intake damper 115. If at decision block 320 it is determined that the intake damper 115 is not partially open, however, then the method 300 follows the "no" branch and the method 300 returns.

A system and method for bimodal air control in a kettle-style grill according to the solution has been described using detailed descriptions of embodiments thereof that are provided by way of example and are not intended to limit the scope of the disclosure. The described embodiments comprise different features, not all of which are required in all embodiments of a bimodal air control system according to the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a system and/or method for bimodal air control in a kettle-style grill according to the solution is not limited by what has been particularly shown and described herein above. Rather, the scope of a system and/or method for bimodal air control in a kettle-style grill according to the solution is defined by the claims that follow.

What is claimed is:

1. A bimodal air control system, the system comprising:
   a plenum configured to removably mount over an underside surface of a kettle-styled grill, wherein the kettle-styled grill comprises one or more damper holes in the underside surface and one or more damper blades corresponding to the one or more damper holes;
   a manually adjustable intake damper located in a side surface of the plenum;
   a mechanical connection between the manually adjustable intake damper and the one or more damper blades;
   an electric fan configured to generate a positive air flow into the plenum; and
   an ash can removably mounted to the plenum and configured to capture ash exiting the kettle-styled grill through the one or more damper holes;
   wherein when the manually adjustable intake damper is in a fully closed state, the one or more damper blades are positioned such that the one or more damper holes are in an open state; and
   wherein when the manually adjustable intake damper is in a partially open state, the one or more damper blades are positioned such that the one or more damper holes are in a partially open state; and
   wherein when the manually adjustable intake damper is in a fully open state, the one or more damper blades are positioned such that the one or more damper holes are in a closed state.

2. The bimodal air control system of claim 1, further comprising an electronic controller in electrical communication with the electric fan.

3. The bimodal air control system of claim 2, further comprising a temperature sensor in electrical communication with the electronic controller, wherein the electronic controller is configured to vary speed of the electric fan based on a signal input from the temperature sensor.

4. The bimodal air control system of claim 3, wherein the electronic controller varies speed of the electric fan according to a proportional-integral-derivative control algorithm.

5. The bimodal air control system of claim 2, wherein the electronic controller is configured to wirelessly communicate with a remote user device.

6. The bimodal air control system of claim 2, wherein the electronic controller comprises a graphical user interface.

7. A bimodal air control system, the system comprising:
   means for removably mounting a plenum over an underside surface of a kettle-styled grill, wherein the kettle-styled grill comprises one or more damper holes in the underside surface and one or more damper blades corresponding to the one or more damper holes;
   means for manually adjusting an intake damper located in a side surface of the plenum;
   means for simultaneously adjusting the one or more damper blades when adjusting the intake damper;
   electromechanical means for generating a positive air flow into the plenum; and
   means for capturing ash exiting the kettle-styled grill through the one or more damper holes and falling through the plenum;
   wherein when the intake damper is in a fully closed state, the one or more damper blades are positioned such that the one or more damper holes are in an open state; and
   wherein when the intake damper is in a partially open state, the one or more damper blades are positioned such that the one or more damper holes are in a partially open state; and
   wherein when the intake damper is in a fully open state, the one or more damper blades are positioned such that the one or more damper holes are in a closed state.

8. The bimodal air control system of claim 7, further comprising means for controlling the electromechanical means for generating a positive air flow into the plenum.

9. The bimodal air control system of claim 8, wherein the means for controlling is configured to vary speed of the electromechanical means for generating a positive air flow into the plenum based on a signal input from a temperature sensor.

10. The bimodal air control system of claim 9, wherein the means for controlling varies speed of the electromechanical means for generating a positive air flow into the plenum according to a proportional-integral-derivative control algorithm.

11. The bimodal air control system of claim 8, wherein the means for controlling is configured to wirelessly communicate with a remote user device.

12. The bimodal air control system of claim 8, wherein the means for controlling comprises a graphical user interface.

13. A method for bimodal air control in a kettle-styled grill, the method comprising:
   mounting a plenum over an underside surface of a kettle-styled grill, wherein the plenum comprises an adjustable intake damper and the kettle-styled grill comprises one or more damper holes in the underside surface and one or more damper blades corresponding to the one or more damper holes;
   removably mounting an ash to the plenum for capturing ash exiting the kettle-styled grill through the one or more damper holes;
   providing a mechanical connection between the manually adjustable intake damper and the one or more damper blades;
   configuring an electric fan to generate a positive air flow into the plenum;
   manually adjusting the intake damper, wherein:
      when the intake damper is in a fully closed state, the one or more damper blades are positioned such that the one or more damper holes are in an open state; and
      when the manually adjustable intake damper is in a partially open state, the one or more damper blades are positioned such that the one or more damper holes are in a partially open state; and when the manually adjustable intake damper is in a fully open state, the one or more damper blades are positioned such that the one or more damper holes are in a closed state.

14. The method of claim 13, further comprising providing an electronic controller in electrical communication with the electric fan.

15. The method of claim 14, further comprising providing a temperature sensor in electrical communication with the electronic controller, wherein the electronic controller is configured to vary speed of the electronic fan based on a signal input from the temperature sensor.

16. The method of claim 15, wherein the electronic controller varies speed of the electronic fan according to a proportional-integral-derivative control algorithm.

17. The method of claim 14, wherein the electronic controller is configured to wirelessly communicate with a remote user device.

18. The method of claim 14, wherein the electronic controller comprises a graphical user interface.

* * * * *